(12) United States Patent
Williams et al.

(10) Patent No.: US 10,956,070 B2
(45) Date of Patent: Mar. 23, 2021

(54) ZEROING A MEMORY BLOCK WITHOUT PROCESSOR CACHING

(71) Applicant: INTERNATIONAL BUSINESS MACHINES CORPORATION, Armonk, NY (US)

(72) Inventors: Derek E. Williams, Round Rock, TX (US); Guy L. Guthrie, Austin, TX (US); Hugh Shen, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 16/216,587

(22) Filed: Dec. 11, 2018

(65) Prior Publication Data

US 2020/0183585 A1   Jun. 11, 2020

(51) Int. Cl.
| | |
|---|---|
| *G06F 12/00* | (2006.01) |
| *G06F 3/06* | (2006.01) |
| *G06F 13/40* | (2006.01) |
| *G06F 12/0831* | (2016.01) |
| *G06F 12/0891* | (2016.01) |
| *G06F 9/38* | (2018.01) |

(52) U.S. Cl.
CPC ............ *G06F 3/064* (2013.01); *G06F 3/0607* (2013.01); *G06F 9/3816* (2013.01); *G06F 12/0831* (2013.01); *G06F 12/0891* (2013.01); *G06F 13/4022* (2013.01); *G06F 3/0679* (2013.01)

(58) Field of Classification Search
CPC .... G06F 3/064; G06F 13/4022; G06F 3/0607; G06F 12/0831; G06F 12/0891; G06F 9/3816; G06F 3/0679; G06F 3/061; G06F 3/0656; G06F 3/0652; G06F 3/067
USPC ........................................................ 711/154
See application file for complete search history.

(56) References Cited

U.S. PATENT DOCUMENTS

| | | | |
|---|---|---|---|
| 5,809,548 A | * | 9/1998 | Chang ................... G06F 12/126 711/133 |
| 7,707,361 B2 | | 4/2010 | Gunna et al. |
| 8,301,843 B2 | | 10/2012 | Gunna et al. |
| 8,812,817 B2 | | 8/2014 | Fuller et al. |

(Continued)

OTHER PUBLICATIONS

POWERPC Processor Guide; UG011(V1.3) Jan. 11, 2010 (Year: 2010).*

(Continued)

*Primary Examiner* — Mardochee Chery
(74) *Attorney, Agent, or Firm* — David M. Quinn; Brian F. Russell

(57) ABSTRACT

A data processing system includes a plurality of processor cores each having a respective associated cache memory, a memory controller, and a system memory coupled to the memory controller. A zero request of a processor core among the plurality of processor cores is transmitted on an interconnect fabric of the data processing system. The zero request specifies a target address of a target memory block to be zeroed and has no associated data payload. The memory controller receives the zero request on the interconnect fabric and services the zero request by zeroing in the system memory the target memory block identified by the target address, such that the target memory block is zeroed without caching the zeroed target memory block in the cache memory of the processor core.

20 Claims, 10 Drawing Sheets

(56) References Cited

U.S. PATENT DOCUMENTS

2006/0106990 A1   5/2006   Benhase et al.
2015/0106545 A1   4/2015   Godard et al.

OTHER PUBLICATIONS

Condit, Jeremy et al., Better I/O Through Byte-Addressable, Persistent Memory, SOSP'09, Oct. 11-14, 2009.
Hardavellas, Nikos et al., Reactive NUCA: Near-Optimal Block Placement and Replication in Distributed Caches, Appears in Proceedings of the 36th Annual International Symposium on Computer Architecture, Austin, TX, Jun. 2009.

* cited by examiner

ZEROING A MEMORY BLOCK WITHOUT PROCESSOR CACHING

BACKGROUND OF THE INVENTION

The present invention relates generally to data processing and, in particular, zeroing blocks of data in a system memory of a data processing system.

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of shared memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a hardware-based cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of coherence states stored in association with the cache lines of each cache hierarchy, as well as a set of coherence messages utilized to communicate the coherence state information between cache hierarchies and a set of actions taken by the cache memories in response to the coherence messages to preserve coherency. In a typical implementation, the coherence state information takes the form of the well-known MESI (Modified, Exclusive, Shared, Invalid) protocol or a variant thereof, and the coherency messages indicate a protocol-defined coherency state transition in the cache hierarchy of the requestor and/or the recipients of a memory access request.

In addition to the hardware management of cache coherency described above, at least some MP systems also support explicit software management of caches through the implementation of cache management instructions. For example, the POWER® instruction set architecture (ISA) includes the data cache block zero (DCBZ) instruction, which initializes a cache line of data to zero within a cache of the executing processor's cache hierarchy (e.g., a store-in L2 cache). Long sequences of DCBZ instructions are commonly utilized to zero entire data pages prior to use (or re-use). For example, to initialize a representative 64 kilobyte (64K) data page in an architecture having 128-byte cache lines, 512 individual cache lines must be zeroed in cache through execution of 512 DCBZ instructions. Assuming a data cache having a capacity of 256K, $64/256$ (e.g., ¼) of the total capacity of the data cache is consumed by each such data page zero instruction sequence. In practice, the fraction of cache capacity holding zeroed cache lines is often much greater than ¼ since multiple data pages are often zeroed sequentially. The data page(s) which are thereby zeroed may be used very sparsely, if at all, meaning that, following initialization of one or more data pages, effective cache capacity is greatly diminished until the initialized data page(s) are eventually evicted from the data cache.

BRIEF SUMMARY

In an attempt to address the consumption of data cache capacity by data page zeroing operations, some prior art systems have set explicit limits on how much of the capacity of a data cache can be allocated to cache lines being zeroed. For example, in one prior art system having a set associative data cache, at most one cache entry in each congruence class is permitted to hold a cache line being zeroed, and this cache line is automatically designated as the entry that is subject to eviction in the event of a cache miss to the congruence class. Thus, in this prior art system, the consumption of cache capacity by zeroed cache lines is capped, but not eliminated.

The present application recognizes that the consumption of cache capacity by data page zeroing operations can be eliminated by implementing a zeroing instruction that causes a target block of memory to be zeroed directly in memory by the system memory controller rather than in a processor cache. In at least one embodiment, a data processing system includes a plurality of processor cores each having a respective associated cache memory, a memory controller, and a system memory coupled to the memory controller. A zero request of a processor core among the plurality of processor cores is transmitted on an interconnect fabric of the data processing system. The zero request specifies a target address of a target memory block to be zeroed and has no associated data payload. The memory controller receives the zero request on the interconnect fabric and services the zero request by zeroing in the system memory the target memory block identified by the target address, such the target memory block is zeroed without caching the zeroed target memory block in the cache memory of the processor core. Additionally, the zero request causes all prior cached copies of the target memory block to be invalidated. It should be appreciated that because the zero request zeros the target memory block at the system memory, no data tenure on the system interconnect is required to zero the target memory block.

DETAILED DESCRIPTION

Figure 1:
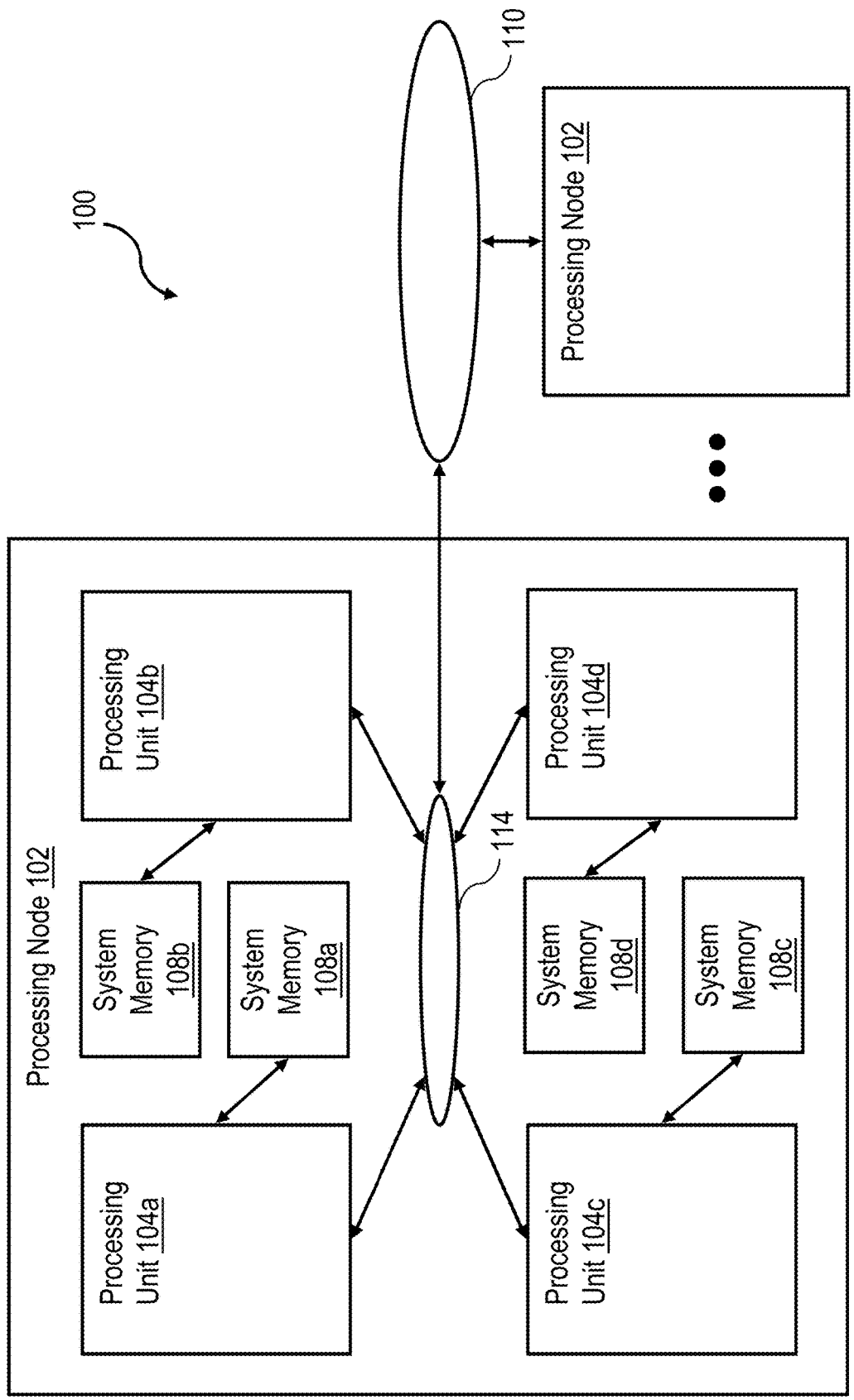
FIG. 1 is a high-level block diagram of an exemplary data processing system in accordance with one embodiment.

With reference now to the figures, wherein like reference numerals refer to like and corresponding parts throughout, and in particular with reference to FIG. 1, there is illustrated a high level block diagram depicting an exemplary data processing system 100 in accordance with one embodiment. In the depicted embodiment, data processing system 100 is a cache coherent symmetric multiprocessor (SMP) data processing system including multiple processing nodes 102 for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form an interconnect fabric.

As described below in greater detail with reference to FIG. 2, processing units 104 each include a memory controller 106 coupled to local interconnect 114 to provide an interface to a respective system memory 108. Data and instructions residing in system memories 108 can generally be accessed, cached and modified by a processor core in any processing unit 104 of any processing node 102 within data processing system 100. System memories 108 thus form the lowest level of memory storage in the distributed shared memory system of data processing system 100. In alternative embodiments, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to data processing systems of diverse architectures and are in no way limited to the generalized data processing system architecture illustrated in FIG. 1.

Figure 2:
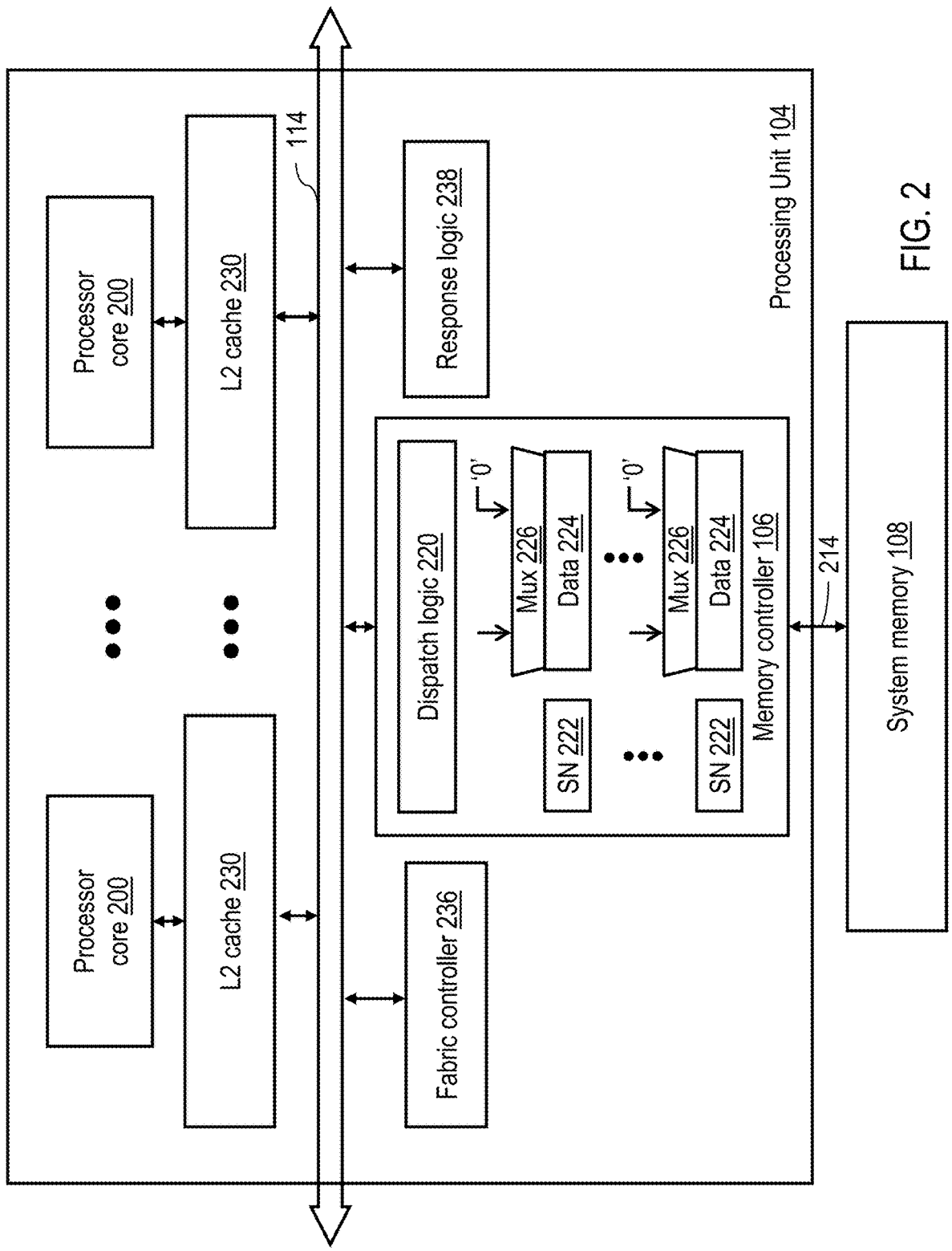
FIG. 2 is a more detailed block diagram of an exemplary processing unit in accordance with one embodiment.

Referring now to FIG. 2, there is depicted a more detailed block diagram of an exemplary processing unit 104 in accordance with one embodiment. In the depicted embodiment, each processing unit 104 is an integrated circuit including one or more processor cores 200 for processing instructions and data. In a preferred embodiment, each processor core 200 supports simultaneous multithreading (SMT) and thus is capable of independently executing multiple hardware threads of execution simultaneously.

The operation of each processor core 200 is supported by a multi-level memory hierarchy having at its lowest level a shared system memory 108 accessed via an integrated memory controller 106. System memory 108 is coupled to its associated memory controller 106 via a communication link 214, including, for example, a request channel, a data channel, and a response channel.

Memory controller 106 includes dispatch logic 220 and multiple memory controller (MC) snoop (SN) machines 222. As described in detail below, dispatch logic 220 receives (snoops) requests on the interconnect fabric, and if necessary, dispatches MC SN machines 222 to service those requests. For example, as described below with reference to FIGS. 7-8, responsive to a data cache block flush and zero (DCBFZ) request that specifies a target address, dispatch logic 220 dispatches a MC SN machine 222 to zero the memory block identified by the target address in system memory 108. Each MC SN machine 222 has an associated data buffer 224 coupled to a multiplexer 226. Under control of the associated SN machine 222, the multiplexer 226 selects, as an input of the data buffer 224, either data received from the interconnect fabric or a value of all zeros to fill the memory block.

Still referring to FIG. 2, at its upper levels, the multi-level memory hierarchy of processor cores 200 includes one or more levels of cache memory, which in the illustrative embodiment include a store-through level one (L1) cache 302 (see FIG. 3) within and private to each processor core 200, and a respective store-in level two (L2) cache 230 for each processor core 200. Although the illustrated cache hierarchies includes only two levels of cache, those skilled in the art will appreciate that alternative embodiments may include additional levels (L3, L4, etc.) of on-chip or off-chip, private or shared, in-line or lookaside cache, which may be fully inclusive, partially inclusive, or non-inclusive of the contents the upper levels of cache.

Each processing unit 104 further includes an integrated and distributed fabric controller 236 responsible for controlling the flow of operations on the interconnect fabric comprising local interconnect 114 and system interconnect 110 and for implementing the coherency communication required to implement the selected cache coherency protocol. Processing unit 104 further includes an instance of response logic 238, which computes and broadcasts on the interconnect fabric, for each request, a "combined response" representing the systemwide coherence response for the request. Computation of the combined response is discussed in greater detail below with reference to FIG. 9.

Figure 3:
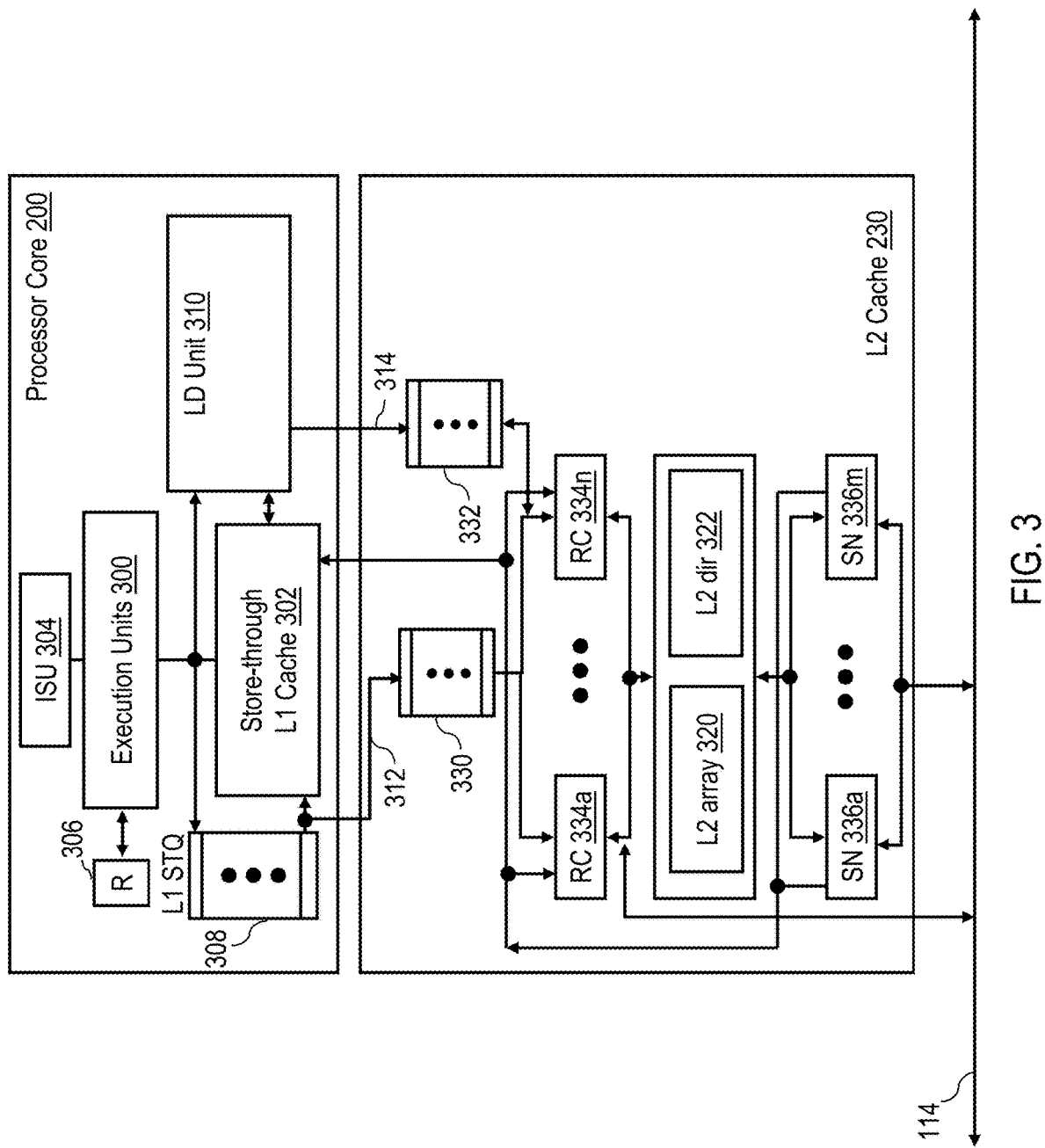
FIG. 3 is a more detailed block diagram of a processor core and lower level cache memory in accordance with one embodiment.

With reference now to FIG. 3, there is illustrated a more detailed block diagram of an exemplary embodiment of a processor core 200 and its affiliated L2 cache 230 in accordance with one embodiment. In the illustrated embodiment, processor core 200 includes one or more execution unit(s) 300, which execute instructions from multiple simultaneous hardware threads of execution. The instructions can include, for example, arithmetic instructions, logical instructions, and memory referent instructions (e.g., loads and stores), as well as cache management instructions such as the data cache block flush and zero (DCBFZ) instruction. It should be appreciated that a DCBFZ instruction as described herein can be implemented with a distinct operational code (opcode), or alternatively, can be implemented by appending a flag to an existing DCBZ or similar opcode. Execution unit(s) 300 can generally execute instructions of a hardware thread in any order as long as data dependencies and explicit orderings mandated by synchronization instructions are observed. Instructions are fetched from the memory hierarchy and dispatched to execution units 300 for execution by an instruction sequencing unit (ISU) 304. Memory blocks obtained from the distributed shared memory system by load accesses are buffered in one or more register files (RFs) 306, and memory blocks updated by store accesses are written to the distributed shared memory system from the one or more register files 306.

Processor core 200 also includes an L1 store queue 308 that temporarily buffers store and synchronization requests generated by execution of corresponding store and synchronization instructions by execution unit(s) 300. Because L1 cache 302 is a store-through cache, meaning that coherence is fully determined at a lower level of cache hierarchy (e.g., at L2 cache 230), requests flow through L1 STQ 308 and then pass via bus 312 to L2 cache 230 for processing. Processor core 200 additionally includes a load unit 310 that temporarily buffers load requests that miss in L1 cache 302. Load unit 310 is coupled to L2 cache 230 by a bus 314.

Still referring to FIG. 3, L2 cache 230 includes a L2 cache array 320 and a L2 directory 322 of the contents of cache array 320. Assuming L2 cache array 320 and L2 directory 322 are set associative as is conventional, storage locations in system memories 108 are mapped to particular congruence classes within cache array 320 utilizing predetermined index bits within the system memory (real) addresses. The particular memory blocks stored within the cache lines of L2 cache array 320 are recorded in L2 directory 322, which contains one directory entry for each cache line. While not expressly depicted in FIG. 3, it will be understood by those skilled in the art that each directory entry in cache directory 322 includes various fields, for example, a tag field that identifies the real address of the memory block held in the corresponding cache line of L2 cache array 320, a state field that indicates the coherency state of the cache line, a replacement order (e.g., Least Recently Used (LRU)) field indicating a replacement order for the cache line with respect to other cache lines in the same congruence class, and inclusivity bits indicating whether the memory block is held in the associated L1 cache 302.

L2 cache 230 includes an L2 store queue (STQ) 330 that receives storage-modifying requests and synchronization requests from L1 STQ 304 via bus 312 and buffers such requests. L2 cache 230 similarly includes a L2 load queue (LDQ) 332 that receives load requests for load unit 310 via bus 314 and buffers such requests. In order to service the requests buffered in L2 STQ 330 and L2 LDQ 332, L2 cache 230 implements multiple Read-Claim (RC) machines 334a-334n, which are each capable of independently and concurrently servicing a request dispatched from one of queues 330-332. In order to service remote requests originating from processor cores 200 other than the affiliated processor core 200, L2 cache 230 also includes multiple L2 snoop (SN) machines 336a-336m. Each snoop machine 336 can independently and concurrently handle a remote request snooped from local interconnect 114. As will be appreciated, the servicing of memory access requests by RC machines 334 may require the replacement or invalidation of memory blocks within cache array 320 (and L1 cache 302). Accordingly, L2 cache 230 may also additionally include unillustrated CO (castout) machines that manage the removal and writeback of memory blocks from cache array 320.

In the exemplary data processing system 100 of FIGS. 1-3, an interconnect operation begins when a master (e.g., a read-claim (RC) machine 334 of an L2 cache 230) broadcasts a request on the interconnect fabric comprising interconnects 110, 114. The request preferably includes at least a transaction type indicating a type of desired access and a resource identifier (e.g., target real address) indicating a resource to be accessed by the request. Common types of requests include those set forth below in Table I.

TABLE I

| Request | Description |
| --- | --- |
| CASTOUT | Copies the image of a memory block from a higher level of memory to a lower level of memory in preparation for the destruction of the higher level copy |
| DCLAIM (Data Claim) | Requests authority to promote an existing read-only copy of a memory block to a unique copy with write authority and with the intent to update (modify) it, invalidating any other cached copies of the memory block |
| DCBZ (Data Cache Block Zero) | Requests authority to create, in cache, a new unique copy of a memory block with write authority containing all zeros, invalidating any other cached copies of the memory block |
| DCBFZ (Data Cache Block Flush and Zero) | Requests authority to create, in system memory, a new unique copy of a memory block containing all zeros, invalidating any other cached copies of the memory block |
| READ | Requests a copy of the image of a memory block with read permission |
| RWITM (Read-With-Intent-To-Modify) | Requests a unique copy of the image of a memory block with write authority to update (modify) it, invalidating any other cached copies of the memory block |
| WRITE | Requests authority to write a new unique copy of a memory block to main memory and invalidate any other cached copies of the memory block |

The request is received (snooped) by coherence participants (e.g., L2 caches 230 and memory controllers 106) distributed throughout data processing system 100. In general, with some exceptions L2 SN machines 336 in the same L2 cache 230 as the master of a request do not snoop the request (i.e., there is generally no self-snooping) because a request is transmitted on the interconnect fabric only if the request cannot be serviced internally by a processing unit 104. Snoopers that receive and process requests may each provide a respective partial response (Presp) representing the response of at least that snooper to the request. A memory controller 106 determines the partial response to provide based, for example, upon whether the memory controller 106 is responsible for the request address and whether it has resources (e.g., a MC SN machine 222) available to service the request. An L2 cache 230 may determine its partial response based on, for example, the availability of a L2 SN machine 336 to handle the request, the availability of its L2 directory 322, and the coherence state associated with the target real address in L2 directory 322.

The partial responses of various snoopers are logically combined either in stages or all at once by one or more instances of response logic 238 to determine a system-wide combined response (Cresp) to the request. In one embodiment, which is assumed hereinafter, the instance of response logic 238 responsible for generating the combined response is located in the processing unit 104 containing the master that issued that request. Response logic 238 provides the combined response to the master and snoopers via the interconnect fabric to indicate the system-wide coherence response (e.g., success, failure, retry, etc.) for the request. If the combined response indicates success of the request, the combined response may indicate, for example, a data source for a target memory block of the request, a coherence state in which the target memory block is to be cached by the master (or other caches), and whether "cleanup" operations invalidating the requested memory block in one or more caches are required.

In response to receipt of the combined response, one or more of the master and snoopers typically perform one or more additional actions in order to service the request. These additional actions may include supplying data to the master, invalidating or otherwise updating the coherence state of data cached in one or more L1 caches 302 and/or L2 caches 230, performing castout operations, writing back data to a system memory 108, etc. If required by the request, a requested or target memory block may be transmitted to or from the master before or after the generation of the combined response by response logic 238.

In the following description, the partial response of a snooper to a request and the actions performed by the snooper in response to the request and/or its combined response may be described with reference to whether that snooper is a Highest Point of Coherency (HPC), a Lowest Point of Coherency (LPC), or neither with respect to the request (target) address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1-3, the LPC will be the memory controller 106 for the system memory 108 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIGS. 1-3, the HPC, if any, will be a particular L2 cache 230. Although other indicators may be utilized to designate an HPC for a memory block, a preferred embodiment of the present invention designates the HPC, if any, for a memory block utilizing selected cache coherence state(s) within the L2 directory 322 of an L2 cache 230.

The HPC, if any, for a memory block referenced in a request, or in the absence of an HPC, the LPC of the memory block, preferably has the responsibility of protecting the transfer of coherence ownership of a memory block, if necessary, in response to a request. This protective function can be performed by providing retry (RTY) partial responses to other requests specifying the same target address until the coherence ownership of the target memory block is transferred.

Figure 4:
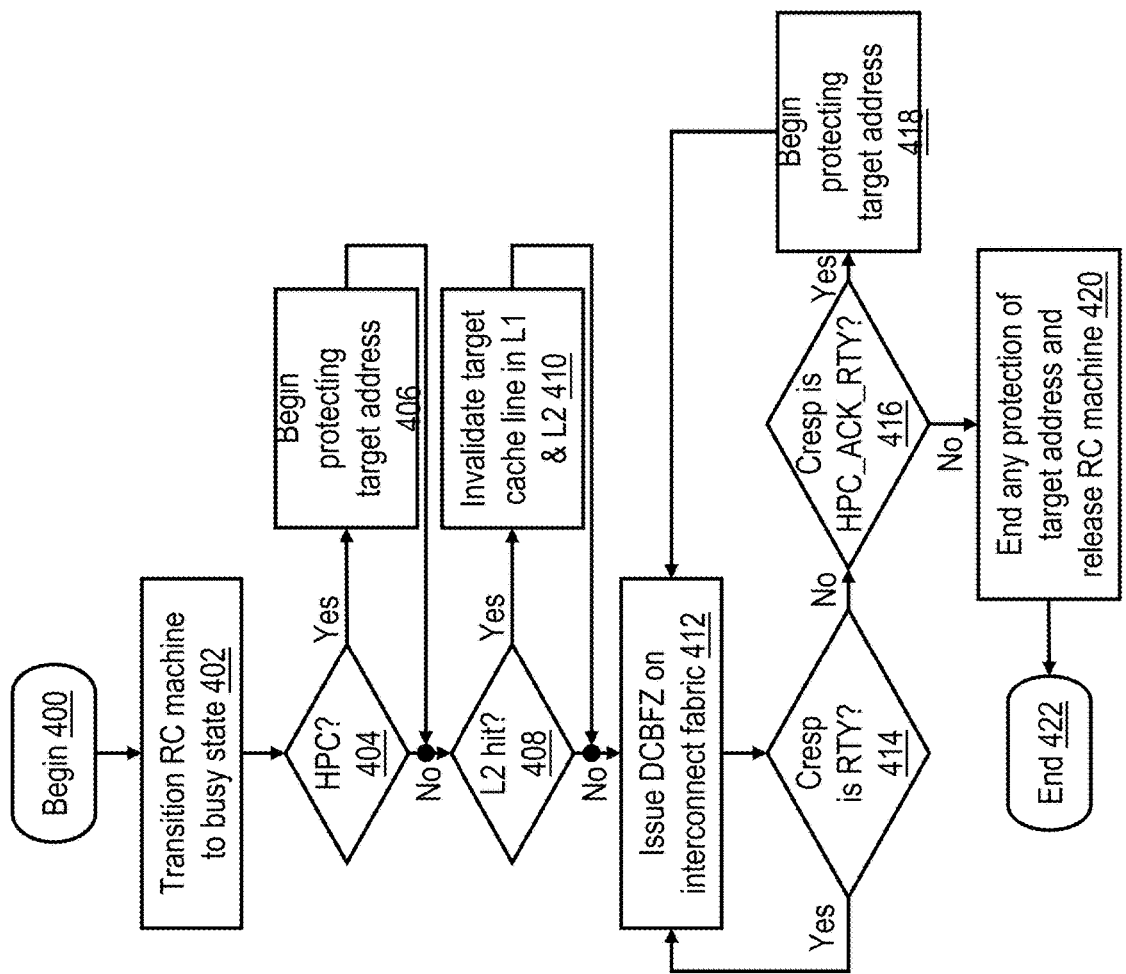
FIG. 4 is a high level logical flowchart of an exemplary method by which a processing unit issues a data cache block flush and zero (DCBFZ) request on an interconnect fabric of a data processing system to zero a memory block in accordance with one embodiment.

With reference now to FIG. 4, there is illustrated a high level logical flowchart of an exemplary method by which a processing unit 104 issues a DCBFZ request on an interconnect fabric of a data processing system to zero a memory block in accordance with one embodiment. The illustrated process begins at block 400, for example, in response to receipt by an L2 cache 230 of a DCBFZ request in its L2 STQ 330 via bus 312. As noted above, this DCBFZ request is generated by execution of a corresponding DCBFZ instruction by execution units 300 of the associated processor core 200.

After possible buffering of the DCBFZ request in L2 STQ 330, dispatch logic of L2 cache 230 dispatches an RC machine 334 to service the DCBFZ request of the associated processor core 200. In response to dispatch of the RC machine 334, the RC machine 334 transitions from an idle state to a busy state (block 402) and determines whether or not this L2 cache 230 is the HPC of the target address of the DCBFZ request (block 404). As indicated above, this determination can be made in at least some embodiments by reference to the coherence state, if any, associated with the target address of the DCBFZ request in L2 directory 322. If a negative determination is made at block 404, the process passes to block 408. In response, however, to a determination at block 404 that this L2 cache 230 is the HPC for the target address of the DCBFZ request, RC machine 334 begins protecting coherence ownership of the target address specified by the DCBFZ request, for example, by providing a RTY partial response to any other request specifying the same target address (block 406). The process then passes from block 406 to block 408.

Block 408 depicts RC machine 334 also determining whether or not the target address of the DCBFZ request hit in L2 directory 322. If so, RC machine 334 initiates an update to L2 directory 322 to associate the target address with an invalid coherence state (block 410). In addition, if the inclusivity bits in L2 directory 322 indicate that a cache line associated with the target address resides in L1 cache 302, at block 410 RC machine 334 also issues a back-invalidation request to L1 cache 302 to invalidate the cache line in L1 cache 302. Following block 410 or in response to a negative determination at block 408, the process of FIG. 4 proceeds to block 412, which illustrates RC machine 334 issuing a broadcast of the DCBFZ request on the interconnect fabric of data processing system 100. This request includes at least a transaction type identifying the request type (e.g., DCBFZ) and a target address of a memory block to be flushed by all caches and zeroed at the appropriate memory controller 106. As indicated by block 414, RC machine 334 continues to iteratively issue this DCBFZ request on the interconnect fabric of data processing system 100 at least until RC machine 334 receives a combined response other than a RTY (retry) combined response.

In response to receipt of a combined response to its DCBFZ request other than RTY, RC machine 334 determines at block 416 whether or not the combined response is HPC_ACK_RTY. As discussed below with reference to block 520 of FIG. 5 and block 918 of FIG. 9, this combined response indicates that a different L2 cache 230 that was the immediately previous HPC of the target memory block has transferred its responsibility for protecting coherence ownership of the target memory block to the RC machine 334 that issued the DCBFZ request. Accordingly, if a HPC_ACK_RTY combined response is received, the RC machine 334 that issued the DCBFZ request begins protecting coherence ownership of the target address of the DCBFZ request, as shown at block 418. The RC machine 334 also assumes responsibility for invalidating any other cached copy or copies of the target memory block. Thereafter, the process returns from block 418 to block 412, which illustrates the RC machine 334 again issuing the DCBFZ request to invalidate any remaining cached copies of the target memory block. However, because the L2 cache 230 that was the immediately previous HPC for the target memory block has now transferred coherence ownership to the RC machine 334 that issued the DCBFZ request, no L2 cache 230 will subsequently issue an HPC_ACK partial response to this DCBFZ request.

Returning to blocks 414-416, if the RC machine 334 determines that no RTY or HPC_ACK_RTY combined response was received for the DCBFZ request, then the issuing RC machine 334 is guaranteed that the DCBFZ request was successfully received by the memory controller 106 responsible for the target address and no cached copies of the target memory block remain to be invalidated. Accordingly, the RC machine 334 that issued the DCBFZ request ends its protection for the target address and is released to return to an idle state, making the RC machine 334 available to service another request (block 420). Thereafter, the process of FIG. 4 ends at block 422.

Figure 5:
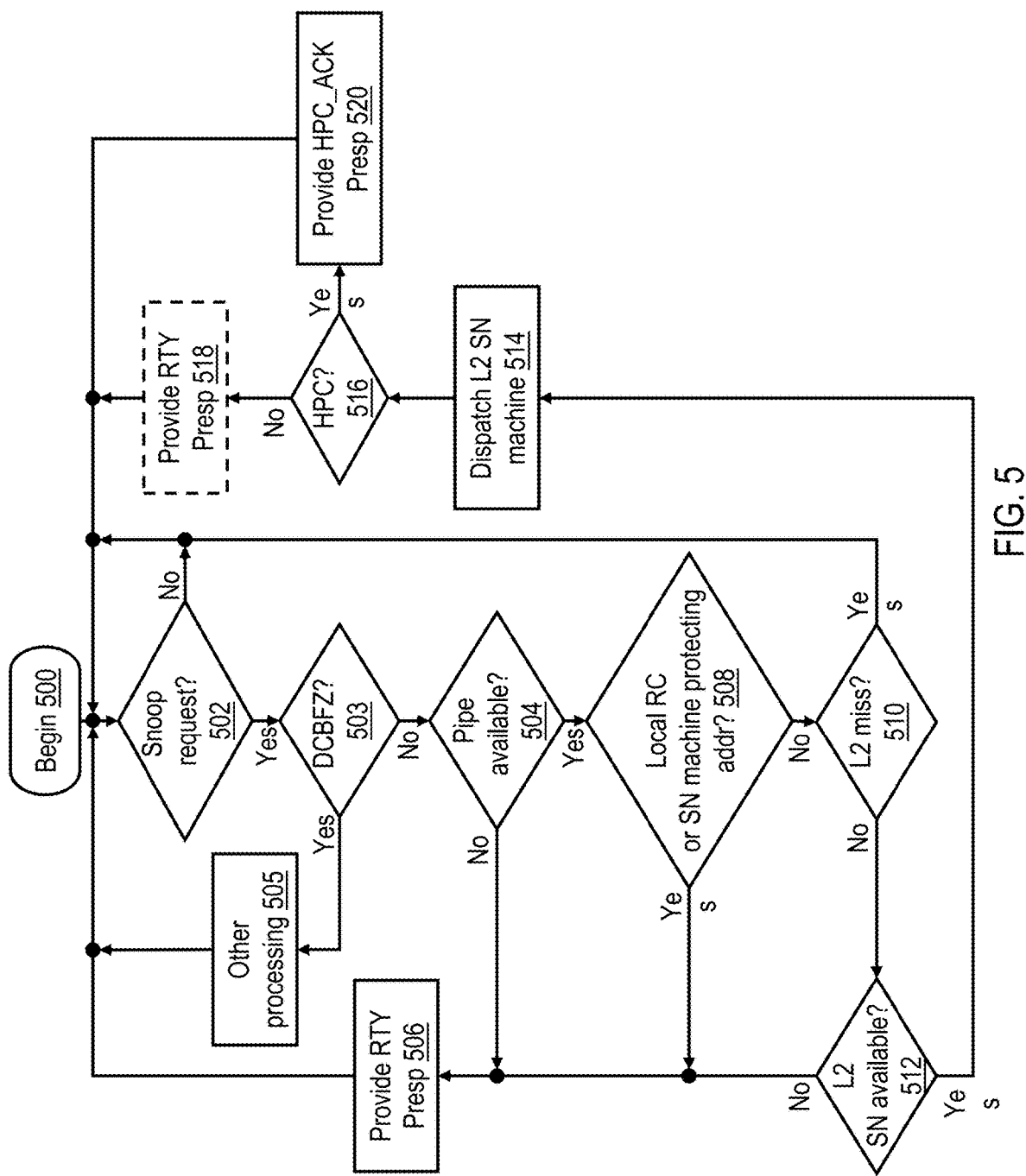
FIG. 5 is a high level logical flowchart of an exemplary method by which dispatch logic of a processing unit handles a snooped DCBFZ request in accordance with one embodiment.

With reference now to FIG. 5, there is illustrated a high level logical flowchart of an exemplary method by which dispatch logic of a processing unit processes a snooped DCBFZ request or other request in accordance with one embodiment. The illustrated process can be performed, for example, by each L2 cache 230 of each processing unit 104 in data processing system 100 other than the L2 cache 230 that issued the DCBFZ request.

The process of FIG. 5 begins at block 500 and then proceeds to block 502, which illustrates an L2 cache 230 monitoring for receipt of a DCBFZ request or other request from the interconnect fabric of data processing system 100. In response to snooping a request on the interconnect fabric, L2 cache 230 determines the type of the request at block 503. If the snooped request is a DCBFZ request, the process proceeds to block 504 and following blocks. If, however, the snooped request is not a DCBFZ request, the processing unit 104 performs other processing (block 505), and the process returns to block 502. At block 504, L2 cache 230 determines whether or not one or more internal communication pipelines required to process the snooped request is/are available. As will be appreciated, requests of the associated processor core 200 and requests of other processor cores 200 snooped on the interconnect fabric compete for the necessary limited resources of each L2 cache 230, and thus the internal communication pipelines used, for example, to track requests and to access L2 directory 322 may be temporarily unavailable due to contention between requests. In response to a negative determination at block 504, L2 cache 230 provides a RTY partial response to the snooped request, as illustrated at block 506. If, however, L2 cache 230 determines at block 504 that the internal communication pipeline (s) required to process the snooped request is/are available, L2 cache 230 additionally determines at block 508 whether or not one of its local RC machines 334 or L2 SN machines 336 is currently busy servicing another request specifying the same target address as the snooped request and is thus responsible for protecting the target address. If so, L2 cache 230 protects the target address of the snooped request by providing a RTY partial response (block 506). The process then returns to block 502.

Returning to block 508, if L2 cache 230 determines that none of its local RC machines 334 or L2 SN machines 336 is currently busy servicing another request specifying the same target address as the snooped request, L2 cache 230 additionally determines at block 510 whether or not the target address specified by the snooped request hits or misses in L2 directory 322. If the target address specified by the snooped request misses in L2 directory 322, L2 cache 230 provides a NULL (or no) partial response, indicating that this L2 cache 230 does not hold a copy of the target cache line in L2 array 320, and the process returns to block 502. However, in response to a determination at block 510 that the target address of the snooped request hits in L2 directory 322, L2 cache 230 additionally determines at block 512 if one of its L2 SN machines 336 is in an idle state and thus available for allocation to service the snooped request. If not, L2 cache 230 provides a RTY partial response (block 506), and the process returns to block 502. If, however, L2 cache 230 determines at block 512 that one of its L2 SN machines 336 is in an idle state and thus available for allocation to service the snooped request, L2 cache 230 dispatches one of its L2 SN machines 336 to service the snooped request (block 514) as described further below with respect to FIG. 6. In addition, L2 cache 230 provides a partial response to the snooped request based on whether or not L2 directory 322 indicates that this L2 cache 230 is the HPC for the target address of the snooped request, as indicated by decision block 516. For example, in some embodiments, L2 cache 230 provides an HPC_ACK partial response (block 520), which initiates transfer of responsibility for protecting coherence ownership of the target memory block to the requesting RC machine 334. If, however, the snooping L2 cache 230 determines that it is not the HPC for the target address of the snooped request, L2 cache 230 optionally provides a RTY partial response, if required by the coherence protocol to prevent posted cache line invalidations (block 518). Following block 518 or block 520, the process of FIG. 5 returns to block 502, which has been described.

Figure 6:
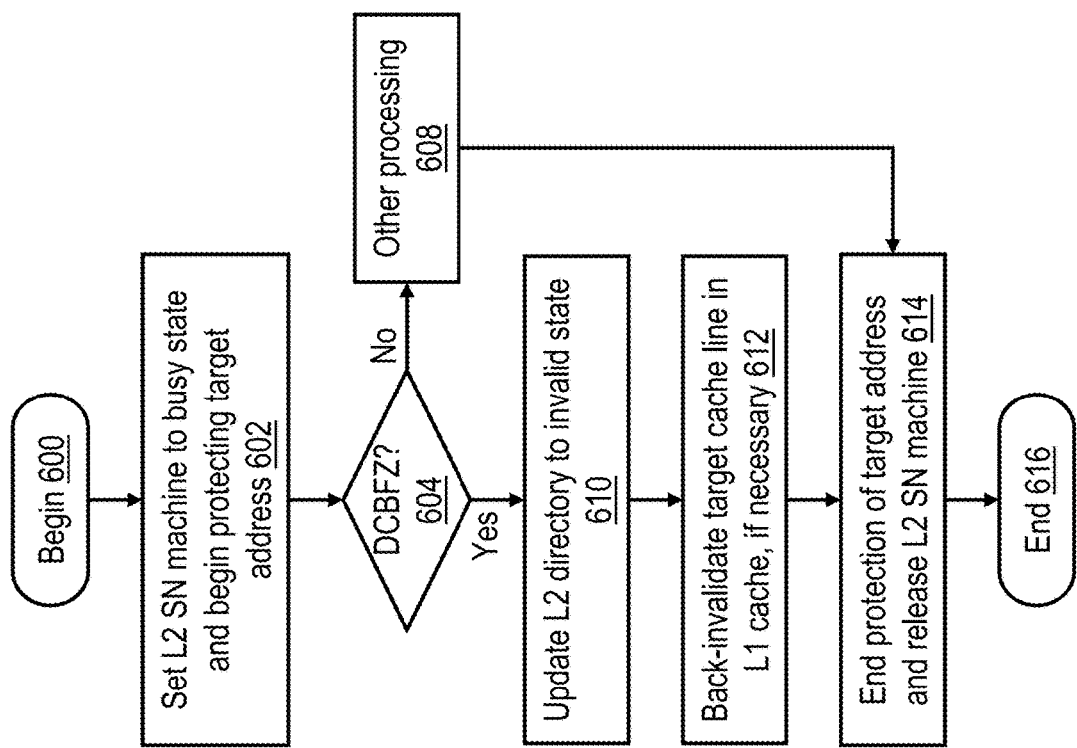
FIG. 6 is a high level logical flowchart of an exemplary method by which a snoop machine of a processing unit handles a snooped DCBFZ request in accordance with one embodiment.

With reference now to FIG. 6, there is illustrated a high level logical flowchart of an exemplary method by which a snoop machine of a processing unit processes a snooped request, such as a DCBFZ request, in accordance with one embodiment. The depicted process may be performed, for example, by an L2 SN machine 336 of an L2 cache 230.

The process of FIG. 6 begins at block 600, for example, in response to dispatch of an L2 SN machine 336 to service a snooped request (e.g., a DCBFZ or other request) at block 514 of FIG. 5. In response to dispatch, the L2 SN machine 336 transitions from an idle state to a busy state and begins protecting the target address of the snooped request (block 602). The L2 SN machine 336 determines the type of the snooped request it was dispatched to service at block 604. If the snooped request is not a DCBFZ request, the L2 SN machine 336 performs other processing, as indicated at block 608. If, however, the snooped request is a DCBFZ request, the L2 SN machine 336 updates the entry in L2 directory 322 for the target address of the DCBFZ request to an invalid coherence state (block 610). In addition, L2 SN machine 336 issues a back-invalidate to invalidate the target address in L1 cache 302 if the inclusivity bits in L2 directory 322 indicate that a copy of the target memory block is held in L1 cache 302 (block 612). Following block 612 or block 608, the L2 SN machine 336 ends its protection of the target address of the DCBFZ request and is released to return to an idle state, thus making the L2 SN machine 336 available for allocation to another snooped request (block 614). Thereafter, the process of FIG. 6 ends at block 616.

Figure 7:
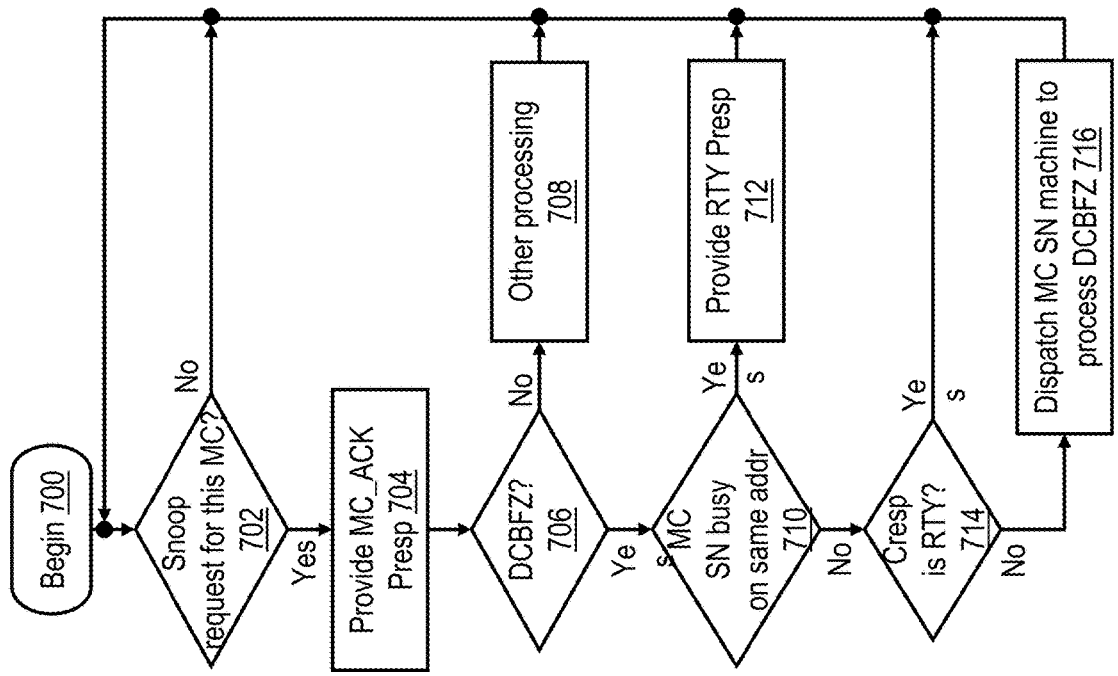
FIG. 7 is a high level logical flowchart of an exemplary method by which dispatch logic of a memory controller of a system memory handles a snooped DCBFZ request in accordance with one embodiment.

With reference now to FIG. 7, there is illustrated a high level logical flowchart of an exemplary method by which dispatch logic 220 of a memory controller 106 of a system memory 108 handles snooped requests (including DCBFZ requests) in accordance with one embodiment. The illustrated process begins at block 700 and then proceeds to block 702, which illustrates dispatch logic 220 determining whether or not a request specifying a target address for which this memory controller 106 is responsible has been snooped on the interconnect fabric. If not, the process of FIG. 7 iterates at block 702. In response to a determination at block 702 that a request specifying a target address for which this memory controller 106 is responsible has been snooped on the interconnect fabric, dispatch logic 220 provides a MC_ACK partial response (block 704). In addition, dispatch logic 220 determines at block 706 whether or not the request snooped on the interconnect fabric is a DCBFZ request. If not, the process passes to block 708, which illustrates dispatch logic 220 performing other processing. Thereafter, the process returns to block 702.

Referring again to block 706, in response to a determination that the snooped request is a DCBFZ request, dispatch logic 220 additionally determines at block 710 whether or not any of its MC SN machines 222 is currently busy servicing another request specifying the same target address as the DCBFZ request snooped at block 702. If so, dispatch logic 220 provides a RTY partial response to the DCBFZ request snooped at block 702 (block 712). As described below with reference to FIG. 9, this RTY partial response will cause a RTY or HPC_ACK_RTY combined response to be provided to the RC machine 334 that issued the DCBFZ request. Following block 712, the process of FIG. 7 returns to block 702, which has been described.

Returning to block 710, if a determination is made that no local MC_SN machine 222 is currently busy servicing another request to the same target address as the DCBFZ request snooped at block 702, dispatch logic 222 additionally determines at block 714 whether or not the combined response for the DCBFZ request is RTY. If so, the process returns to block 702 without dispatching a local MC SN machine 222 to service the snooped DCBFZ request. If, however, the combined response for the DCBFZ request is other than RTY, dispatch logic 220 dispatches an idle MC SN machine 222 to handle the snooped DCBFZ request (block 716). Following block 716, the process of FIG. 7 returns to block 702, which has been described.

Figure 8:
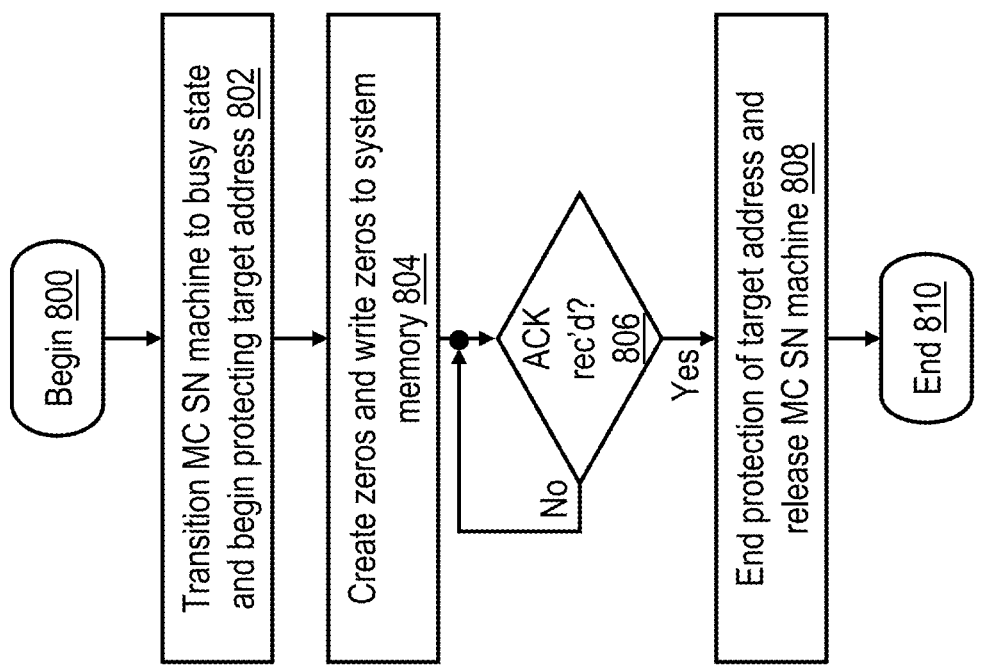
FIG. 8 is a high level logical flowchart of an exemplary method by which a snoop machine of a memory controller of a system memory handles a snooped DCBFZ request in accordance with one embodiment.

Referring now to FIG. 8, there is illustrated a high level logical flowchart of an exemplary method by which a MC SN machine 222 of a memory controller 106 of a system memory 108 handles snooped DCBFZ requests in accordance with one embodiment.

The illustrated process begins at block 800, for example, in response to dispatch logic 220 dispatching an idle MC SN machine 222 to service a snooped DCBFZ request at block 716 of FIG. 7. In response to dispatch of the MC SN machine 222, the dispatched MC SN machine 222 transitions from an idle state to a busy state and begins protecting the target address of the DCBFZ request (block 802). In addition, MC SN machine 222 fills the target memory block identified by the target address of the DCBFZ request with zeros (block 804). In the depicted embodiment, MC SN machine 222 zeroes the target memory block by first filling its associated data buffer 224 with zeros through selection of the "zero" input of the associated multiplexer 226. The MC SN machine 222 then writes the contents of this data buffer 224 into system memory 108 via communication link 214. By creating the unique copy of zeroed memory block at memory controller 106 rather than at an L2 cache 230, no processor cache capacity is consumed in zeroing the target memory block. In addition, because the DCBZ request has no data payload, a data tenure on the interconnect fabric is saved that would otherwise be required to write a zeroed memory block from an L2 cache 230 to memory controller 106.

As depicted at block 806, following the memory write at block 804 MC SN machine 222 awaits receipt of an acknowledgement signal (ACK) from system memory 108 that confirms completion of the memory write. In response to receipt of this ACK signal via communication link 214, MC SN machine 222 ends protection of the target address of the DCBFZ request and is released to return to an idle state (block 808). Thereafter, the process of FIG. 8 ends at block 810.

Figure 9:
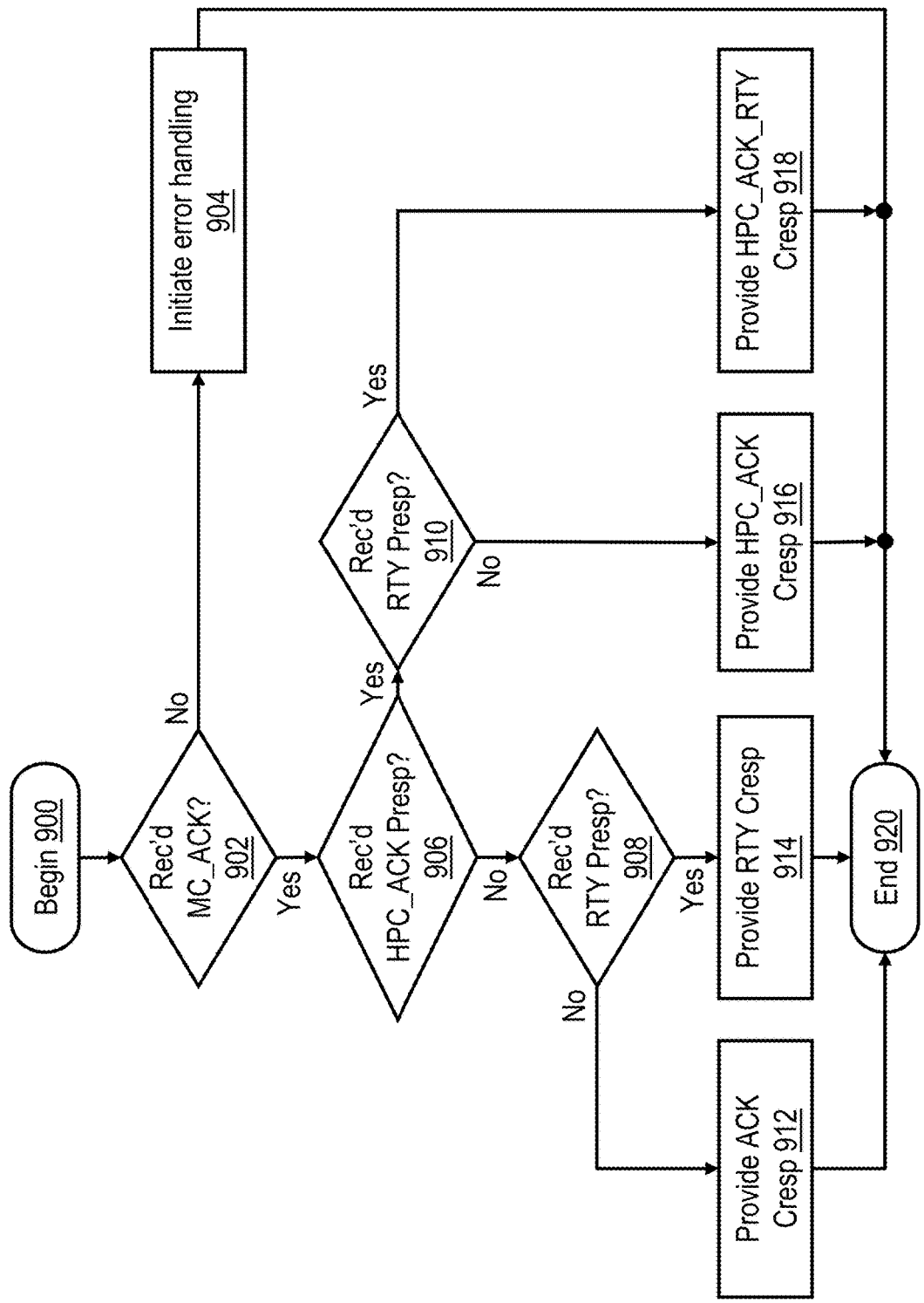
FIG. 9 is a high level logical flowchart of an exemplary method by which response logic determines a combined response of a DCBFZ request in accordance with one embodiment.

With reference now to FIG. 9, there is illustrated a high level logical flowchart of an exemplary method by which response logic determines a combined response of a DCBFZ request in accordance with one embodiment. As noted above, in a preferred embodiment, the process of FIG. 9 is performed by the instance of response logic 238 local to (i.e., in the same processing unit 104 as) the RC machine 334 that initiates the DCBFZ request.

The process of FIG. 9 begins at block 900 and then proceeds to block 902, which illustrates response logic 238 determining whether or not a MC_ACK partial response to a pending DCBFZ request was received. If no MC_ACK partial response was received, meaning that the DCBFZ request did not find the memory controller 106 responsible for the target address, response logic 238 initiates handling for this error condition (block 904). Thereafter, the process of FIG. 9 ends at block 920.

Returning to block 902, if response logic 238 received a MC_ACK partial response for the DCBFZ request, response logic 238 additionally determines at blocks 906, 908, and 910 if any HPC_ACK and/or RTY partial response was received for the DCBFZ request. As indicated, at least four possible combinations of partial response are possible. If no HPC_ACK or RTY partial response is received for the DCBFZ request at blocks 906 and 908, response logic 238 generates and broadcasts on the interconnect fabric an ACK combined response (block 912), which as indicated at blocks 414 and 416 of FIG. 4 permits the RC machine 334 that issued the DCBFZ request to be retired. In addition, the ACK combined response permits the responsible memory controller 106 to dispatch a MC SN machine 222 to service the DCBFZ request, as discussed above with reference to blocks 714-716 of FIG. 7. If, however, response logic 238 received no HPC_ACK partial response, but received at least one RTY partial response to the DCBFZ request, response logic 236 generates and broadcasts on the interconnect fabric a RTY combined response (block 914), which causes the master RC machine 334 to reissue the DCBFZ request, as discussed above with reference to block 412-414 of FIG. 4. If response logic 238 instead determines at blocks 906 and 910 that a HPC_ACK partial response was received and no RTY partial response was received, response logic 238 provides an HPC_ACK combined response (block 916). As indicated at blocks 414 and 416 of FIG. 4, this combined response permits the RC machine 334 that issued the DCBFZ request to be retired. In addition, the ACK combined response permits the responsible memory controller 106 to dispatch a MC SN machine 222 to service the DCBFZ request, as discussed above with reference to blocks 714-716 of FIG. 7. Finally, if response logic 238 determines at blocks 906-908 that it received a HPC_ACK partial response and at least one RTY partial response, response logic 222 generates and broadcasts on the interconnect fabric an HPC_ACK_RTY combined response (block 918). As discussed above with reference to block 416 of FIG. 4, this combined response transfers responsibility for protecting coherence ownership of the target memory block from the immediately previous HPC to the RC machine 334 that issued the DCBFZ request. Following any of blocks 912-918, the process of FIG. 9 ends at block 920.

Figure 10:
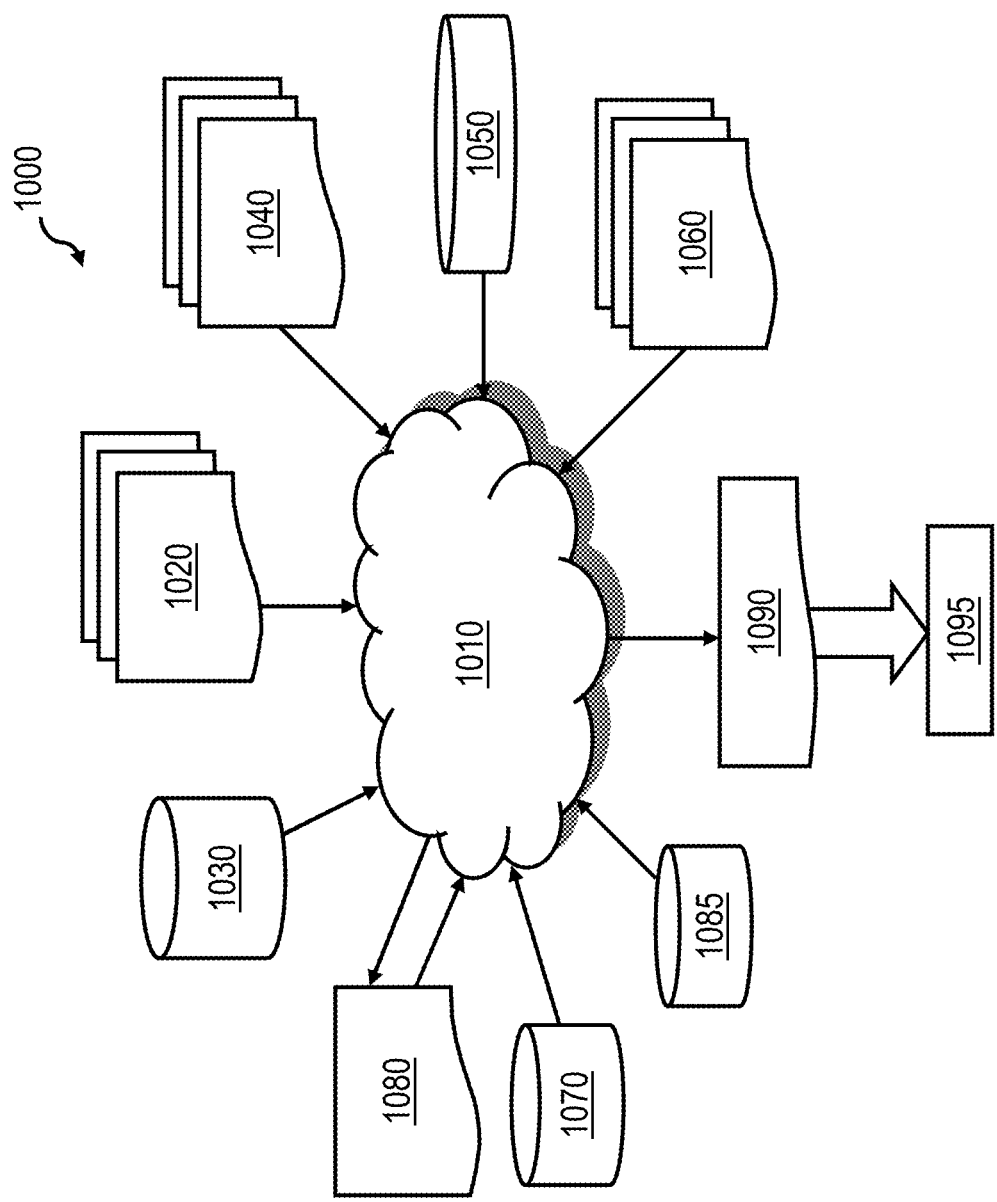
FIG. 10 is a data flow diagram illustrating a design process.

With reference now to FIG. 10, there is depicted a block diagram of an exemplary design flow 1000 used for example, in semiconductor IC logic design, simulation, test, layout, and manufacture. Design flow 1000 includes processes, machines and/or mechanisms for processing design structures or devices to generate logically or otherwise functionally equivalent representations of the design structures and/or devices described above and shown in FIGS. 1-3. The design structures processed and/or generated by design flow 1000 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1000 may vary depending on the type of representation being designed. For example, a design flow 1000 for building an application specific IC (ASIC) may differ from a design flow 1000 for designing a standard component or from a design flow 1000 for instantiating the design into a programmable array, for example a programmable gate array (PGA) or a field programmable gate array (FPGA) offered by Altera® Inc. or Xilinx® Inc.

FIG. 10 illustrates multiple such design structures including an input design structure 1020 that is preferably processed by a design process 1000. Design structure 1020 may be a logical simulation design structure generated and processed by design process 1000 to produce a logically equivalent functional representation of a hardware device. Design structure 1020 may also or alternatively comprise data and/or program instructions that when processed by design process 1000, generate a functional representation of the physical structure of a hardware device. Whether representing functional and/or structural design features, design structure 1020 may be generated using electronic computer-aided design (ECAD) such as implemented by a core developer/designer. When encoded on a machine-readable data transmission, gate array, or storage medium, design structure 1020 may be accessed and processed by one or more hardware and/or software modules within design process 1000 to simulate or otherwise functionally represent an electronic component, circuit, electronic or logic module, apparatus, device, or system such as those shown in FIGS. 1-3. As such, design structure 1020 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1000 preferably employs and incorporates hardware and/or software modules for synthesizing, translating, or otherwise processing a design/simulation functional equivalent of the components, circuits, devices, or logic structures shown in FIGS. 1-3 to generate a netlist 1080 which may contain design structures such as design structure 1020. Netlist 1080 may comprise, for example, compiled or otherwise processed data structures representing a list of wires, discrete components, logic gates, control circuits, I/O devices, models, etc. that describes the connections to other elements and circuits in an integrated circuit design. Netlist 1080 may be synthesized using an iterative process in which netlist 1080 is resynthesized one or more times depending on design specifications and parameters for the device. As with other design structure types described herein, netlist 1080 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1000 may include hardware and software modules for processing a variety of input data structure types including netlist 1080. Such data structure types may reside, for example, within library elements 1030 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1040, characterization data 1050, verification data 1060, design rules 1070, and test data files 1085 which may include input test patterns, output test results, and other testing information. Design process 1000 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1000 without deviating from the scope and spirit of the invention. Design process 1000 may also include modules for performing standard circuit design processes such as timing analysis, verification, design rule checking, place and route operations, etc.

Design process 1000 employs and incorporates logic and physical design tools such as HDL compilers and simulation model build tools to process design structure 1020 together with some or all of the depicted supporting data structures along with any additional mechanical design or data (if applicable), to generate a second design structure 1090. Design structure 1090 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1020, design structure 1090 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-3. In one embodiment, design structure 1090 may comprise a compiled, executable HDL simulation model that functionally simulates the devices shown in FIGS. 1-3.

Design structure 1090 may also employ a data format used for the exchange of layout data of integrated circuits and/or symbolic data format (e.g., information stored in a GDSII (GDS2), GL1, OASIS, map files, or any other suitable format for storing such design data structures). Design structure 1090 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-3. Design structure 1090 may then proceed to a stage 1095 where, for example, design structure 1090: proceeds to tape-out, is released to manufacturing, is released to a mask house, is sent to another design house, is sent back to the customer, etc.

As has been described, in at least one embodiment a data processing system includes a plurality of processor cores each having a respective associated cache memory, a memory controller, and a system memory coupled to the memory controller. A zero request of a processor core among the plurality of processor cores is transmitted on an interconnect fabric of the data processing system. The zero request specifies a target address of a target memory block to be zeroed and has no associated data payload. The memory controller receives the zero request on the interconnect fabric and services the zero request by zeroing in the system memory the target memory block identified by the target address, such the target memory block is zeroed without caching the zeroed target memory block in the cache memory of the processor core.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a processor of a data processing system to cause the data processing system to perform the described functions. The computer-readable storage device can include volatile or non-volatile memory, an optical or magnetic disk, or the like, but excludes non-statutory subject matter, such as propagating signals per se, transmission media per se, and forms of energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a data processing system including a plurality of processor cores each having a respective associated one of a plurality of cache memories, a memory controller, and a system memory coupled to the memory controller, the method comprising:
    transmitting on an interconnect fabric of the data processing system a zero request of a processor core among the plurality of processor cores, wherein the zero request specifies a target address of a target memory block to be zeroed and has no associated data payload; and
    the memory controller receiving the zero request on the interconnect fabric and servicing the zero request by zeroing in the system memory the target memory block identified by the target address, wherein the target memory block is zeroed without caching the zeroed target memory block in the cache memory of the processor core.

2. The method of claim 1, and further comprising:
    the processor core generating the zero request by executing a zero instruction.

3. The method of claim 1, wherein:
    the processor core is a first processor core and the cache memory is a first cache memory;
    the plurality of processor cores includes a second processor core having a second cache memory; and
    the method further comprises the second cache memory invalidating a non-zeroed copy of the target memory block in the second cache memory responsive to the zero request.

4. The method of claim 3, and further comprising the second cache memory transferring responsibility for protecting coherence ownership of the target address of the zero request to the first cache memory.

5. The method of claim 4, wherein the transferring includes providing a coherence message to the zero request.

6. The method of claim 1, wherein:
    the memory controller includes a data buffer having a zero input; and
    servicing the zero request includes filling the data buffer with zeros and writing contents of the data buffer into the target memory block in the system memory.

7. A memory controller for a system memory of a data processing system including a plurality of processor cores each having a respective associated one of a plurality of cache memories, the memory controller comprising:
    an integrated circuit configured to perform:

receiving on an interconnect fabric of the data processing system a zero request of a processor core among the plurality of processor cores, wherein the zero request specifies a target address of a target memory block to be zeroed and has no associated data payload; and servicing the zero request by zeroing in the system memory the target memory block identified by the target address, wherein the target memory block is zeroed without the zeroed target memory block being cached in the cache memory of the processor core.

8. The memory controller of claim 7, wherein:
the memory controller includes a data buffer having a zero input; and
the memory controller services the zero request by filling the data buffer with zeros and writing contents of the data buffer into the target memory block in the system memory.

9. A data processing system comprising:
the memory controller of claim 7;
the plurality of processor cores including the processor core;
the plurality of cache memories; and
the interconnect fabric.

10. The data processing system of claim 9, wherein the processor core includes an execution unit that generates the zero request by executing a zero instruction.

11. The data processing system of claim 9, wherein:
the processor core is a first processor core and the cache memory is a first cache memory;
the plurality of processor cores includes a second processor core having a second cache memory; and
the second cache memory invalidates a non-zeroed copy of the target memory block in the second cache memory responsive to the zero request.

12. The data processing system of claim 11, wherein the second cache memory transfers responsibility for protecting coherence ownership of the target address of the zero request to the first cache memory.

13. The data processing system of claim 12, wherein the second cache memory transfers responsibility for protecting coherence ownership of the target address of the zero request to the first cache memory by providing a coherence message to the zero request.

14. A design structure tangibly embodied in a computer-readable storage device for designing, manufacturing, or testing an integrated circuit, the design structure comprising:

a memory controller for a system memory of a data processing system including a plurality of processor cores each having a respective one of a plurality of cache memories, wherein the memory controller is configured to perform:

receiving on an interconnect fabric of the data processing system a zero request of a processor core among the plurality of processor cores, wherein the zero request specifies a target address of a target memory block to be zeroed and has no associated data payload; and servicing the zero request by zeroing in the system memory the target memory block identified by the target address, wherein the target memory block is zeroed without the zeroed target memory block being cached in the cache memory of the processor core.

15. The design structure of claim 14, wherein:
the memory controller includes a data buffer having a zero input; and
the memory controller services the zero request by filling the data buffer with zeros and writing contents of the data buffer into the target memory block in the system memory.

16. The design structure of claim 14, and further comprising:
the plurality of processor cores; and
the plurality of cache memories.

17. The design structure of claim 16, wherein the processor core includes an execution unit that generates the zero request by executing a zero instruction.

18. The design structure of claim 16, wherein:
the processor core is a first processor core and the cache memory is a first cache memory;
the plurality of processor cores includes a second processor core having a second cache memory; and
the second cache memory invalidates a non-zeroed copy of the target memory block in the second cache memory responsive to the zero request.

19. The design structure of claim 18, wherein the second cache memory transfers responsibility for protecting coherence ownership of the target address of the zero request to the first cache memory.

20. The design structure of claim 19, wherein the second cache memory transfers responsibility for protecting coherence ownership of the target address of the zero request to the first cache memory by providing a coherence message to the zero request.

* * * * *